Aug. 19, 1969 W. O. STIBAL 3,461,573

MODERN MATHEMATICS DEMONSTRATION UNIT

Filed Sept. 5, 1967 3 Sheets-Sheet 1

INVENTOR.
WILLARD O. STIBAL
BY John H. Widdowson
Phillip A. Rein
ATTORNEYS

INVENTOR.
WILLARD O. STIBAL

BY John H. Widdowson

ATTORNEYS

MODERN MATHEMATICS DEMONSTRATION UNIT

Filed Sept. 5, 1967 3 Sheets-Sheet 3

INVENTOR.
WILLARD O. STIBAL
BY John H. Widdowson
Phillip A. Rein
ATTORNEYS

United States Patent Office 3,461,573

Patented Aug. 19, 1969

3,461,573

MODERN MATHEMATICS DEMONSTRATION UNIT

Willard O. Stibal, 1601 Whittier, Emporia, Kans. 66801

Continuation-in-part of application Ser. No. 444,465, Mar. 31, 1965. This application Sept. 5, 1967, Ser. No. 665,465

Int. Cl. G09b 23/04

U.S. Cl. 35—34 12 Claims

ABSTRACT OF THE DISCLOSURE

A board has a coordinate graph with equal unit areas and X and Y axes dividing same into quadrants. One quadrant has trigometric indicia along the top and side, and angle indicia corresponding to the trigometric. Another quadrant has numerical base indicia adjacent an upper edge. Volumetric unit members increasing in size by one volumetric unit from one to several units, and mathematical symbol elements are attachable in use to the board. The volumetric unit is equal to the cube of a unit area of the coordinate graph.

This application is a continuation-in-part of the applicant's parent application entitled "Modern Mathematics Demonstration Unit," filed Mar. 31, 1965, Ser. No. 444,465 and now abandoned.

Various types of mathematical teaching aids are known to the prior art but these are limited in usage, normally requiring the use of pegs in holes and fail to provide the visual three dimensional relationships which is needed for efficient demonstration of mathematical concepts and relationships. Additionally, the prior art teaching aids are limited in application to use for addition, subtraction, and multiplication and cannot be used to efficiently and effectively teach the basic relationship of fractions, decimals, various numerical base systems, etc. It is submitted that none of the prior art teaching aids provide an efficient and effective means for achieving student understanding in regards to trigometric functions and the values thereof.

In accordance with the present invention, a new and novel mathematical demonstration unit is provided usable as by students and teachers as an educational aid including a large demonstration board having charts or graphs on opposite sides thereof; a plurality of three dimensional unit bars; a trigometric function bar; and a plurality of symbol elements usable in understanding the procedure of addition, subtraction, division and multiplication. The demonstration board is provided with a primary side having a large coordinate graph marked thereon including intersecting X and Y axes to divide the graph into quadrants I to IV, inclusive, each quadrant composed of one-hundred square units. The center of the board is provided with an indication of the zero starting point for the X and Y axes and starting therefrom, a ten-unit circle is inscribed upon the board having angular relationships of 30, 45, and 60 degree positions indicated upon the circle in the first quadrant. Additionally, on the outer upright edge of the first quadrant is provided sine indicia and the upper horizontal portion presents cosine indicia relative to trigometric functions of a given angle. In the second quadrant, the upper horizontal portion is provided with a numerical base system to the conventional unit 10 usable to indicate addition, subtraction, multiplication and other systems in a manner to be explained. The opposite side of the demonstration board is provided with a 144 unit square grid graph and a plurality of lowermost base rows for various operations as required. Starting from the upper left hand corner of this side of the demonstration board, the equal unit squares therein are numbered consecutively from 1 through 100 for use in addition and subtraction at the elementary level. Above the top row of the horizontal units, a numerical base system is provided to the base 12 usable in a manner to be explained. It is understood that our conventional mathematical system is to the base 10; however, it is important that the students realize that such system is arbitrary and may be changed as it is conventionally found in the computer field of today. The unit bars are provided with equal volumetric numerical indications of values 1 through 12, inclusive, and it is understood that a plurality of each of these unit bars is provided in the overall mathematical demonstration unit. These bars are color coded to represent similar color coded levels on the coordinate and grid graphs on the teaching board of this invention. The equal volumetric relationship of the unit bars provides a ready visual indication to the student of equality so as to be readily usable in teaching similar relationships of equal volumes of units such as apples, oranges, etc. The trigometric function bar is of a ten-unit bar size having one side provided with a plurality of unit indicating indicia and the upper and lower ends of this side are provided with pivot peg members for its use in teaching trigometric relationships in relation with the circle on the coordinate graph of the demonstration board. The symbol elements are provided with an equality symbol; an inequality triangular symbol; an addition symbol; a subtraction or division symbol; and a circular dot member used as a division element as required. Again, it is obvious that a plurality of each of these symbol elements would be provided in a demonstration unit as numerous ones thereof might be needed in any given problem to be solved. Each of the symbol elements and the unit bars are provided with a cut-out groove portion on a back side thereof to receive one or a plurality of spaced magnetic plate members so that the same is attachable to the demonstration board which is made of a metal magnetically responsive material so that the symbols and unit bars can be readily used in vertical positions which is extremely desirable in teaching demonstrations. It is noted that the numerous unit bars and symbols of this invention are usable in various positions and relationships on the demonstration board for addition, subtraction, division, multiplication, percent, trigometric functions, and other complicated teaching processes.

Accordingly, it is an object of this invention to provide a new and novel mathematic demonstration unit overcoming the above-mentioned disadvantages of the prior art devices.

Another object of this invention is to provide a mathematic demonstration unit so constructed to aid in the discovery and understanding of concept relationships in the emphasis of modern mathematics to show pattern relationships among things representing mathematical concepts rather than the mere mechanical memorization of isolated facts.

Another object of this invention is to provide a mathematic demonstration unit having a demonstration board with graphical representations thereon and a plurality of volumetric unit bars and symbol elements so as to compare unit areas to unit areas on the demonstration board; unit volumes of one set of unit bars to other sizes of unit bars; and the use of unit bars positioned on the graphical representations of the demonstration board representing a solution for a compound problem.

One further object of this invention is to provide a mathematical demonstration unit having a demonstration board provided with graphical representations on opposite sides thereof usable with a plurality of volumetric unit bars, a trigometric function bar, and a plurality of mathematical operation indicating symbols all usable in combination with each other to teach the processes of addition, subtraction, multiplication, division, fractions, decimals, percents, place values, operations of various numerical base systems trigometric functions, and area transformation of an algebraic equation.

Still, one further object of this invention is to provide a mathematical demonstration unit that is readily usable by a teacher in instructing pupils in mathematical concepts and relationships relative to volumetric and unit concepts and to provide a learning assembly which can be readily used by individual pupils to readily practice the constructive development and relationship of mathematics.

Still, one other object of this invention is to provide a mathematical demonstration unit which is easily understood and usable by both students and teachers; readily portable from the classroom to other areas, and relatively inexpensive in capital investment.

Various other objects, advantages, and features of the invention will become obvious to those skilled in the art, taken in conjunction with the accompanying drawings, in which.

Figure 1:
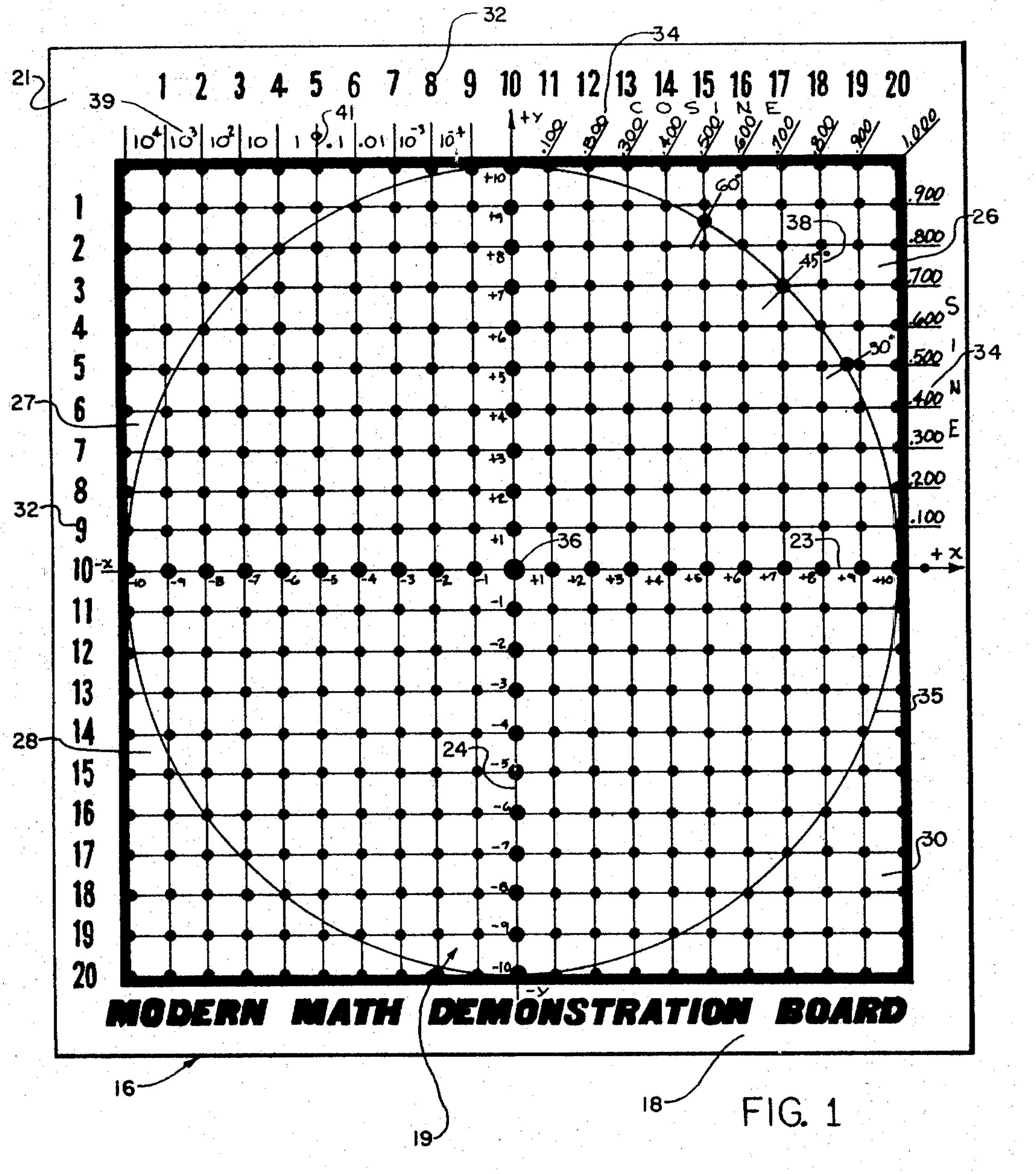
FIG. 1 is a top plan view of the primary side of a demonstration board of the mathematical demonstration unit of this invention.

The following is a description of preferred specific embodiments of the new mathematic demonstration unit of this invention, such being made with reference to the drawings, whereupon the same reference numerals are used to indicate similar parts and/or structure. It is understood that such discussions and descriptions are not to unduly limit the scope of the invention.

Referring to the drawings in detail and in particular to FIG. 1, the mathematical demonstration unit of this invention, indicated generally at 16, includes a rectangular demonstration board 18 having a coordinate graph 19 printed on a front or primary side 21 thereof. The board 18 is preferably constructed of a sheet material that is magnetically responsive to attract and hold a magnetic element thereagainst as will be explained. The coordinate graph 19 is provided with X and Y axes 23 and 24, respectively, to define quadrants 26, 27, 28, and 30 conventionally known as quadrants I, II, III and IV, respectively. Each quadrant consists of a one hundred-unit square area having the units identified by numerical row line indicia 32 from one to twenty, inclusive, extended horizontally adjacent to the top portion and also vertically extended along the left side in FIG. 1. In the first quadrant 26, a trigometric value indicia 34 is supplied along the upper and side edges, respectively, whereby each unit of the one hundred-unit square along the X and Y axes 23 and 24 equals .100 in the trigometric value functions as will be explained. These same value functions may be used in all operations with percents and decimals.

The coordinate graph 19 is further provided with an enlarged circle 35 equal to ten-units in radius having its center coinciding with an intersecting or center point 36 of the X and Y axes 23 and 24. In the first quadrant 26, the circle 35 is provided with angular indicia 38 of 30°, 45°, and 60° relative to the center point 36 and the horizontal X axis 23. The angular indicia 38 relates to the trigometric value indicia 34 as shown by the terms "cosine" and "sine" printed adjacent upper and sides, respectively. The upper edge of the second quadrant 27 is provided with a numerical base indicia 39 to the base 10 indicative from a baseline 41 to the left from 1 to 10 to the fourth power and to the right from .1 to 10 to the minus fourth power.

Figure 2:
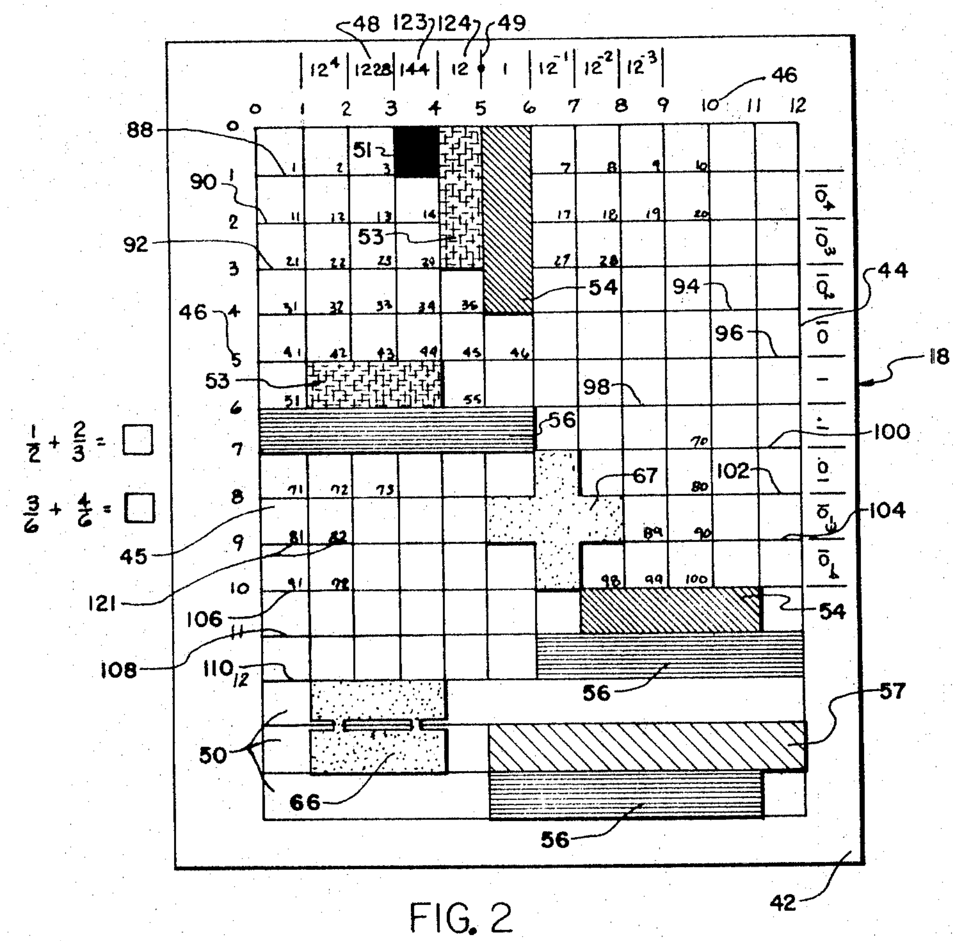
FIG. 2 is a reduced view similar to FIG. 1 illustrating the opposite or secondary side of the demonstration board of this invention.

As shown in FIG. 2, an opposite or secondary side 42 of the demonstration board 18 is provided with a 144-square grid graph 44 having equal grid units 45 printed thereon. Each of the grid units 45 is of a size equal to those of the coordinate graph 19 for reasons to become obvious. Starting at the upper left hand of the grid graph 44, numerical indicia 46 from 1 to 12 is provided about the upper edge and the left side, respectively. Above the upper, horizontal numerical indicia 46, a numerical base twelve indicia 48 is provided having a center line 49 with positive powers of twelve to the left and negative powers of twelve to the right. A plurality of horizontal rows 50 are positioned below the grid graph 44 for use in solving various algebraic equations and the like.

Figures 5, 6, 7, 8, 9, 10, 11, 12:
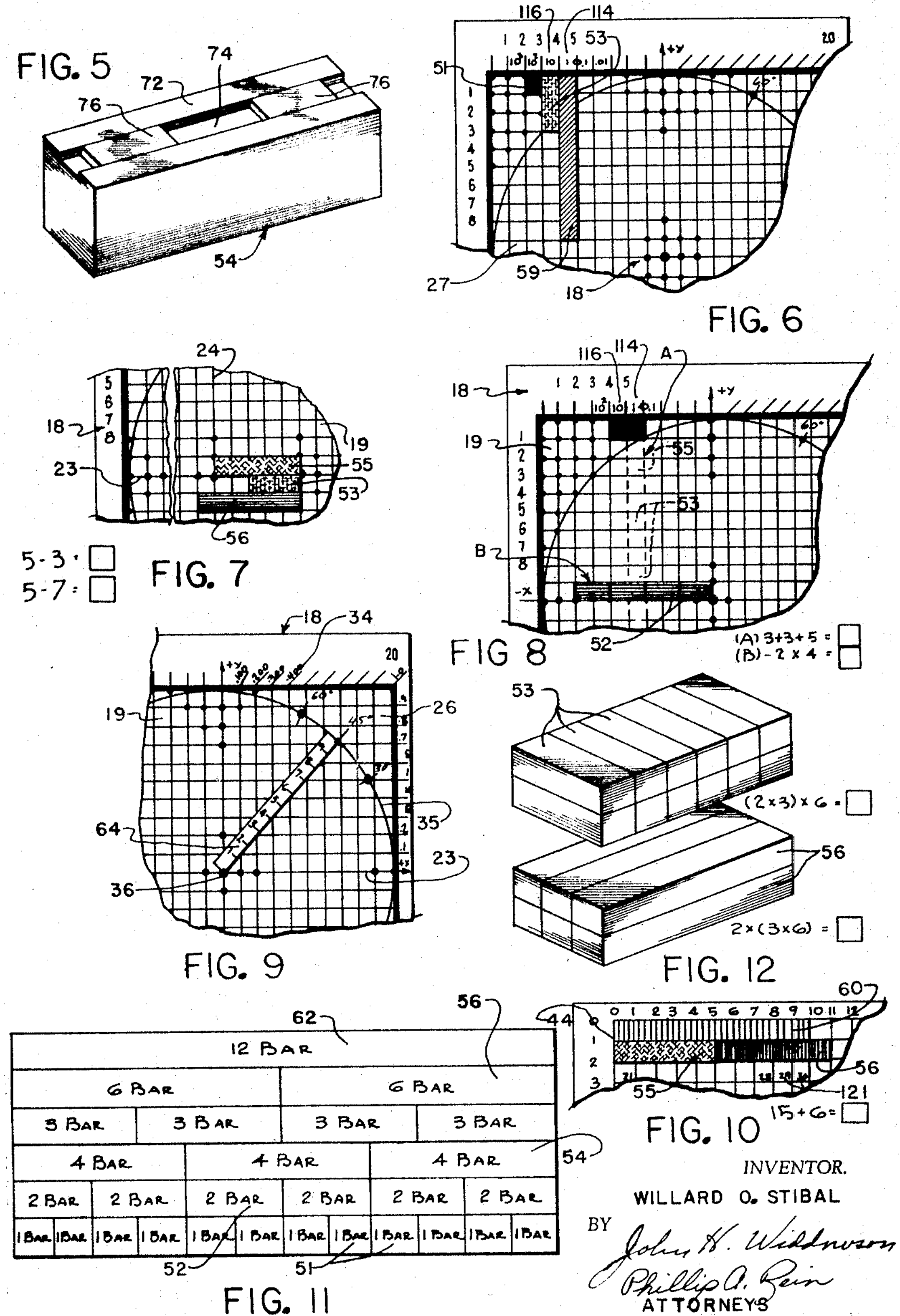
FIG. 5 is an enlarged perspective view showing the construction of one of the mathematical unit bars of this invention.
FIG. 6 is a fragmentary plan view illustrating the primary side of the demonstration board having a plurality of the mathematical unit bars placed thereon.
FIG. 7 is a fragmentary plan view illustrating addition and subtraction on the primary side of the demonstration board of this invention.
FIG. 8 is a plan view similar to FIG. 6 illustrating addition and multiplication with the use of the mathematical unit bars.
FIG. 9 is a fragmentary plan view of the primary side of the demonstration board illustrating its use with the trigometric function bar for teaching trigometric relationships.
FIG. 10 is a fragmentary plan view of the secondary side of the demonstration board illustrating addition therefrom.
FIG. 11 is an enlarged plan view of a plurality of the mathematical unit bars indicating fraction equivalents.
FIG. 12 is a perspective view of a plurality of the mathematical unit bars used to indicate multiplication and volumetric equivalence.

The mathematic demonstration unit 16 further includes a plurality of unit bars 51 to 62, inclusive; a trigometric function bar 64; an inequality symbol 65; an equality symbol 66; an addition and multiplication symbol 67; a subtraction and division element 68; and a division symbol 69. The unit bars 51 to 62, inclusive indicate numerals 1–12 with the unit bar 51 being a one-unit volume and each successive bar thereafter increasing progressively relative to unit volumes. In other words, the two-unit bar 52 is one-fifth the volumetric size and length of the ten-unit bar 60 so as to give relative visual indication of mathematical concepts in three dimensions. As shown in FIG. 5, the four-unit bar 54 is preferably constructed of a main body portion having a bottom support surface 72 provided with an axial extended groove 74 therein. The height and width of the four-unit bar 54 is identical to the one unit measurement with the length equal to four of these unit measurements. The groove 74 is adapted to receive a pair of magnet plate members 76 secured thereto as by adhesive or the like for magnetically adherring to the demonstration board 18. It is obvious that all of the unit bars 51 to 62 are constructed similarly only varying in an overall length and number of magnetic plate members 76 needed to securely adhere the same to the demonstration board 18.

Figure 4:
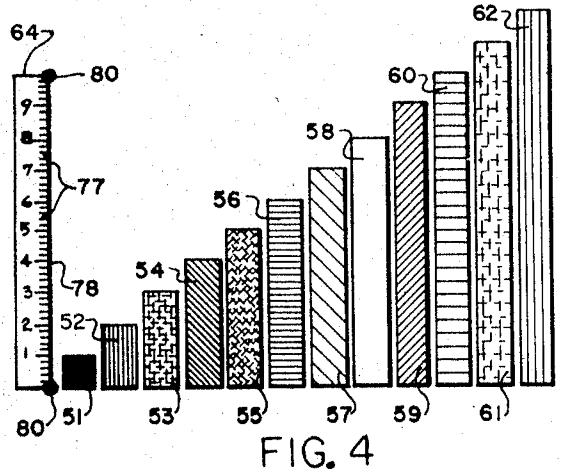
FIG. 4 is a top plan view of one complete set of the mathematical unit bars of the demonstration unit of this invention.

The trigometric function bar 64 is similar to the ten-unit bar 60 in size except having the right hand edge, as viewed in FIG. 4, provided with a plurality of length indicating indicia 77 from one to ten and having graduations thereon for measurements to unit base 10 system usable with the trigometric circle 35 on the demonstration board 18 as will be explained. Adjacent the graduated side 78 of the trigometric function bar 64 and at opposite ends thereof, are peg members 80 extended slightly below the lower surface so as to be usable as pivot points for providing rotation about the center point 36 on the coordinate graph 19 during measurement of trigometric functions as will be explained.

Figure 3:
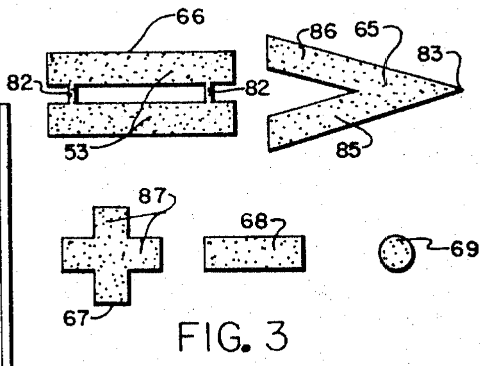
FIG. 3 is a top plan view of various mathematical symbols of the demonstration unit of this invention.

In regard to the mathematical indicative symbols, the equality symbol 66 is constructed of a pair of three-unit bars 53 joined together as by peg members 82 so as to be spaced and extended parallel to each other appearing as the conventional equality symbol. The inequality symbol 65 is of triangular shape having a pointed end 83 with outwardly diverging leg portions 85 and 86. It is obvious that the inequality symbol 65 is usable in the position as shown in FIG. 3 or reversed 180 degrees therefrom so as to indicate direction of inequality as found in mathematical concepts. The addition and multiplication symbol 67 is of a conventional cross shape having intersecting arms 87 of a length equal to the three-unit bars 53. As seen in FIG. 3, the symbol 67 indicates addition but may be rotated 45° to indicate multiplication. The subtraction and division element 68 is substantially equal to a three-unit bar 53 but could be color coded to distinguish the same therefrom. The division symbol 69 is merely a cylindrical dot having two of the same usable with the division element on upper and lower sides thereof to indicate a division problem in a conventional manner. It is seen, therefore, that all the mathematical symbols are substantially similar to those used in solving conventional mathematical problems except the three dimensional effect allows the same to be moved about the demonstration board 18 as required for easy demonstration to the student. Additionally, it is obvious that these mathematical symbols are all provided with magnetic plate members 76 on their bottom surface for ready adherrence to the demonstration board 18 as previously described in detail for the four-unit bar 54.

The mathematical demonstration unit 16 is provided with a color coded relationship between the numerous unit bars, the coordinate graph 19, and the grid graph 44 to aid in the understanding thereof visually in addition to the three dimensional relationship. For example, the unit bars 51 to 62, inclusive, are each separately colored throughout their main bodies 71 with the one-unit bar 51 being colored black; the two-unit bar 52 being colored red; the three-unit bar 53 being colored light yellow; the four-unit bar 54 being colored green; the five-unit bar 55 being colored orange; the six-unit bar 56 being colored light blue; the seven-unit bar 57 being colored purple; the eight-unit bar 58 being colored white; the nine-unit bar 59 being colored brown; the ten-unit bar 60 being colored dark blue; the eleven-unit bar 61 being colored dark yellow; and the twelve-unit bar 62 being colored pink. The numerous equality, inequality, division/subtraction, and addition symbols are all colored gray so that the same will not be confusing with the unit bars.

As shown in FIG. 2, the grid graph 44 is similarly color coded with each of the horizontal lines numbered 1 to 12, inclusive, on the left side color coded from top to bottom to correspond with the colors of the aforementioned unit bars from 1 to 12, respectively. For example, a line 88 covering numerals 1 through 10 is black; a line 90 covering numerals 11 through 20 is colored red; a line 92 covering numerals 21 through 30 is colored yellow; a line 94 covering numerals 31 to 40 is colored green; a line 96 covering numerals 41 to 50 is colored orange; a line 98 covering numerals 51 through 60 is colored blue; a line 100 covering numerals 61 through 70 is colored purple; a line 102 covering numerals 71 through 80 is colored white; a line 104 covering numerals 81 through 90 is colored brown; a line 106 covering numerals 91 through 100 is colored dark blue; a line 108 is colored dark yellow; and a line 110 is colored pink as the last two provide for use of the grid graph 44 to the base element 12 as will be explained. The rows 50 provide a storage or operational area on the grid graph 44 and may be colored as desired.

Similarly, the coordinate graph 19, as shown in FIG. 1, is provided with color coding of the horizontal lines in the second quadrant 27 on the lines numbered on the left side 1 to 10, inclusive. The color coding is identical to that of the grid graph 44 without lines 108, 110 and is especially beneficial with the usage of the numerical base indicia 39 to the base 10 as will be explained.

In the use and operation of the mathematical demonstration unit 16 of this invention, each of the unit bars 51 to 62, inclusive, is represented by the aforementioned color code and volumetric size to the given unit or integral to teach numerous mathematical concepts. As seen in FIG. 6, addition to the base 10 is readily accomplished in the second quadrant 27 whereby ten-units in a vertical column 114 is equal to one-unit in a ten-unit column 116 and such applies to values less than 1. For example, one can add 4+5+7 by using the four-unit bar 54, the five-unit bar 55, and the seven-unit bar 57 placed end to end in the column 114. This would extend below the dark blue line 106 indicating the sum greater than 10 whereby the student would substitute this ten-unit value with a one-unit bar 51 in the ten-unit column 116. The remaining portion of the sum is equal to a six-unit bar 56 whereby the student would read one-unit in column 116 and six units in column 114 which is equal to 16, the sum of 4+5+7. This operation can be repeated with each column having the ten units or more being replaced by one unit in the next higher column to teach progressive addition. The sum of 139 is illustrated in FIG. 6 and it is seen that the tenths, hundredths, etc. can also be added in this manner. Additionally, subtraction could be effected in a similar manner working in the opposite direction by placing the sum on the coordinate graph 19, such as the 139 total, and removing the sum to be subtracted therefrom. Simple multiplication can also be achieved on the coordinate graph 19 by teaching the same as addition of the elements. In other words, 4×6 can be shown by using four of the six-unit bars 56 and adding the sum to achieve a two-unit bar 52 in column 116 and a four-unit bar 54 in column 114 to indicate 24, the product of 4×6.

As shown in FIG. 7, the coordinate graph 19 can be used for adding and subtracting positive and negative numbers by using the X-axis 23 and the required unit bars. For example, a problem such as 5−3=? can be solved by placing a five-unit bar 55 along the X-axis 23 and thereupon subtracting by placing a three-unit bar 53 at the right end of the five-unit bar 55 whereupon the answer is indicated visually by the two units to the Y-axis 24 and also by the numerical indication of "2" along the X-axis 23. Similarly, the problem of 5−7=? can be solved by placing a seven-unit bar 57 in the similar manner adjacent the five-unit bar 55 whereupon the answer thereto is indicated as to the left of the Y-axis 24 and as shown by the numerical indication "−2" adjacent the X-axis 23. It is obvious that numerous problems could be solved in this manner such as 9−7+6+3−2=? whereupon the student needs to merely learn the proper direction for the plus and minus usage on the coordinate graph 19 and he is given a visual indication of each operation for very beneficial and effective student learning.

As shown in FIG. 8, a problem 3+3+5=? can be solved by merely adding the respective three-unit bars 53 and the five-unit bar 55 vertically in the column 114 whereupon it is seen that the sum of same extends beyond the ten-unit line 106 which the same is replaced by a one-unit bar 51 in the column 116 and a one-unit bar 51 in the column 114 to indicate the sum, namely $$3+3+5=10+1=11$$

Additionally it is seen that a multiplication of minus numbers can be solved along the X-axis 23 as shown in solving a problem of −2×4=?. For example, the student merely takes a two-unit bar 52 and places the same on the minus side of the X-axis 23 and takes four of the same whereby the answer is indicated by the numerical indication along the X-axis 23, namely the answer of "−8."

In regard to solving trigometric functions, the trigometric function bar 64 is usable within the first quadrant 26 in conjunction with the cosine and sine trigometric value indicia 34 along the upper and right hand side thereof. For example, if one takes the circle 35 and the point of indication of the 30° angle and following the same horizontally to the trigometric value indicia 34, it is seen that the sine of the 30° angle is equal to .5000. If the same point is followed vertically to the horizontal value indicia 34, it is seen that the cosine of the 30° angle is equal to .8660. It is obvious that the same applies to the other angular degrees from 0 to 90 degrees indicated in the first quadrant 26 relative to the X-axis 23 and the center point 36. The trigometric function bar 64 is provided with the length indicating indicia 77 whereupon the lower one of the peg members 80 are placed upon the point 36 for rotating the trigometric function bar 64 about the same to achieve various indications of sine or cosine of an angle as desired. Additionally, the indicia 77 can be used therewith to achieve precise measurement indications of the horizontal and vertical dimensions of a given angle whereupon a trigometric table could be used with these readings to read the degrees at which the trigometric function bar 64 is positioned. It is obvious that such could be very beneficial in teaching trigometric relationships and angular values visually such as the sum of the squares of the sides is equal to the square of the hypotenuse in right triangular relationships. Additionally, it is obvious that the values taken from the trigometric relationships in the first quadrant 26 can be used by comparing the relationship of the opposite side to the adjacent side to find the tangent and cotangent of a given angle whereupon a trigometric table could be used therefrom to find the actual degrees to which the trigometric function bar 64 is placed.

As shown in FIG. 10, the grid graph 44 is provided with consecutively numbered indicia 121 usable for addition similar to the coordinate graph 19 but goes farther in providing a given sum therefrom. For example, in the addition in the sum of 15+6=?, it is seen that the 15 is indicated by the addition of a ten-unit bar 60 and a five-unit bar 55 added thereto and then the six-unit bar 56 is extended to the end of the five-unit bar 55. The same extends outwardly of the ten-unit to which base the problem is being solved whereupon the six-unit bar 56 is replaced by its equivalent, namely a five bar 55 and a one unit bar 51 and the one-unit bar 51 is placed on the third horizontal row. The answer to this problem is indicated both visually by the unit bars and numerically by the indicia 121 on the grid graph 44. Additionally, the grid graph 44 can be used with the unit bars to show a variety of concepts, such as regrouping and addition and subtracting or proving that the product of a sum such as "9×8=72." The grid graph 44 can be used in developing precision and addition of the two digit add-ends for example, to add 36+47, go to the 36 unit block on the grid graph 44 and move down 4 tens, or four rows to the 76 and then over to the right to seven-unit areas to 83. It is obvious that in doing this that you are breaking the sum of "47" down to its components 4 tens and a seven-unit whereupon the sum is indicated by the numerical indicia 121 on the grid graph 44.

As shown in FIG. 2, the grid graph 44 is further used with the base indicia 48 and the unit bars to teach the mathematical concepts to bases other than the conventional ten-unit. For example the twelve base indicia 48 is shown along the top edge of the grid graph 44 and a one-unit bar 51, a three-unit bar 53, and a four-unit bar 54 are shown placed adjacent each other in vertical alignment with certain ones of the columns. For example, the one-unit bar 51 under a 144 column 123 indicates such a total with the three-unit bar 53 under a 12 column 124 indicates 36 instead of a conventional 30 whereupon this numerical indication is equal to the numeral 184 instead of 134 which would be indicated if the same was base 10. It is seen, therefore, that the mathematical demonstration unit 16 of this invention is very beneficial in teaching the numerical concepts to variable base components and such is very useful today in the extremely complicated field of computors teaching binary systems and the like.

In the addition of fractions as indicated in FIG. 2, the sum of $\frac{1}{2}+\frac{2}{3}=?$ can be solved by achieving a common denominator 6 whereupon the same equals $\frac{3}{6}+\frac{4}{6}=?$. This can be shown graphically on the demonstration board 18 and is shown by a three-unit bar 53 mounted upon the common denominator six-unit bar 56 and having the addition symbol 67 between the other fraction being a four-unit bar 54 over a six-unit bar 56 thereby illustrating in three dimension the written problem. An equality symbol 66 is used to indicate the possible answers whereupon it is seen that the addition of the three and four-units over the common denominator six-unit results in a seven-unit bar 57 mounted over the six-unit bar 56. Whenever this is achieved, the student is aware that one over one or an equality over an equality is equal to one and there is one unit left over whereupon the sum of $\frac{1}{2}+\frac{2}{3}=1\frac{1}{6}$.

As shown in FIG. 11, the numerous unit bars are also usable to show patterns of equal addends for teaching addition, multiplication, and fractional relationships. For example, it is seen that the stacked bar in FIG. 11 is very beneficial in teaching the following sums in multiplication and addition:

$$1\times 12=12$$
$$6\times 2=12$$
$$4\times 3=12$$
$$3\times 4=12$$
$$2\times 6=12$$
$$12+0=12$$
$$6+6=12$$
$$3+3+3+3=12$$
$$4+4+4=12$$
$$2+2+2+2+2+2=12$$
$$1+1+1+1+1+1+1+1+1+1+1+1=12$$

It is obvious that this relationship can be adapted using a pattern for 9, 8, 6, etc. to show the various components of these numerals and it is also beneficial in teaching the common denominator concept. It is seen that volumetric visual observation of these various components of equal addends plus color coded relationship is very beneficial in teaching the student the various mathematical relationships.

As shown in FIG. 12, the unit bars of this invention are extremely beneficial in teaching the "Associative Law of Multiplication of Natural Numbers." This is to show to the student that "$(a)(b\times c)$" is equal to $(a\times b)c$ as shown in the specific volumetric example, it is seen that $(2\times 3)\times 6$ is equal to $2\times(3\times 6)$ and is readily seen by the build up of the unit bars.

The mathematical demonstration unit 16 is usable in many other ways to teach the solution of algebraic equations and the formation of a slope line in trigometric functions. For example, in using the unit bars for representation of an equation such as a $Y=X+1$, the same can be solved in regular trigometric relationship on assuming a value for X and finding the resultant value for Y to indicate the resultant slope of the line therefrom. Using the equation $Y=3X+4$, a three-unit bar 53 placed starting at four (the Y intercept) extends to seven and these two points are sufficient to define the line ratio of three for a rise of one for the slope of the equation.

It is seen therefore that the mathematical demonstration unit of this invention has provided a compact assembly readily usable by the teacher and student for demonstrating numerous algebric, geometric, and mathematical problems so as to be readily understood by color coding and three dimensional effect. This invention has been tested under classroom conditions has proven to be quite effective in shortening the time period required for students to solve various problem situations and additionally does not result in the mere memorization of certain fact situations without the really necessary essential, portion of understanding the mathematical concepts. The mathematical demonstration unit of this invention is easy to use both by the pupil and the teacher, and is of relative low cost to manufacture making the same readily feasible for both pupil and teacher usage.

Additionally the mathematical demonstration unit is compact and lightweight so as to be readily transportable from classroom to home for use by the student in a most efficient manner.

While the invention has been described in connection with preferred specific embodiments thereof, it will be understood that this description is intended to illustrate and not to limit the scope of the invention which is defined by the following claims.

I claim:

1. A mathematic demonstration unit for teaching and participating in the discovery and proving of mathematic concepts, comprising:
  (a) a demonstration board including a coordinate graph on one side thereof having a plurality of equal unit areas,
  (b) a plurality of volumetric unit members attachable to said demonstration board, each varying in size from an adjacent size by one volumetric unit,
  (c) said one volumetric unit equal to the cubic of one of said unit areas of said coordinate graph,
  (d) a plurality of mathematical symbol elements attachable to said demonstration board, and
  (e) said coordinate graph having X and Y axes dividing same into first, second, third, and fourth quadrants, trigometric value indicia adjacent the upper and right side edges of said first quadrant, angle indicia in said first quadrant corresponding with said trigometric value indicia, and numerical base indicia adjacent an upper edge of said second quadrant.

2. A mathematic demonstration unit as described in claim 1, wherein:
  (a) said X and Y axes intersecting at a center point in the center of said coordinate graph,
  (b) said first, second, third, and fourth quadrants each having 100 of said unit areas of square size, and
  (c) said coordinate graph having a ten-unit circle inscribed thereon intersecting said angle indicia in said first quadrant to indicate the relative trigometric values of right triangles having ten-unit hypotenuse as shown on said trigometric value indicia.

3. A mathematic demonstration unit as described in claim 2, including:
  (a) a trigometric function bar having distance indicia extending along one side thereof and peg members at opposite ends of said one side, and
  (b) one of said peg members positionable on said center point for rotation thereabout to locate angular position on said circle for understanding relative angle sizes and trigometric functions.

4. A mathematic demonstration unit as described in claim 1, wherein:
  (a) said unit members varying in size from a one volumetric unit member by successive unit volumes in length to and including a twelve unit member, and
  (b) each of said unit members of various sizes provided with identifying individual colors so as to provide a ready visual indication of volumetric and numerical length size.

5. A mathematic demonstration unit as described in claim 4, wherein:
  (a) said coordinate graph having a plurality of horizontally extended lines thereon separating various unit areas vertically, row lines indicia extended along the left side of said coordinate graph aligned with respective ones of said lines for sequential numbering thereof, and said horizontal lines in said second quadrant color coded so as to agree in length and color with said unit bar members from the upper edge of said coordinate graph which may be placed thereon.

6. A mathematic demonstration unit as described in claim 1, wherein:
  (a) said unit areas separated by a plurality of vertically extended lines and a plurality of horizontally extended lines and said X and Y axes extended through a plurality of said vertical lines and said horizontal lines, respectively,
  (b) said coordinate graph having consecutive numerical indicia adjacent said X-axis and on said Y axis from said center point and indicating a negative sequential value when extended downwardly and the left of said center point thereby resembling a trigonometric and geometric coordinate graph structure, and
  (c) said unit members mountable upon said coordinate graph adjacent said X-axis and other said unit members mounted adjacent thereto whereby the result of addition and subtraction of positive and negative numbers can be readily observed by said sequential numerical indicia on said X-axis.

7. A mathematic demonstration unit as described in claim 1, wherein:
  (a) said numerical base indicia in said second quadrant having a base line and numerous vertically extended columes on opposite sides thereof representing positive values to the base ten in one direction and negative values to the base ten in the opposite direction,
  (b) said unit members mountable in said upright columes in said second quadrant for the addition of numerous units thereof,
  (c) said coordinate graph having a plurality of horizontal lines in said second quadrant, and
  (d) said lines and said unit members correspondingly color coded whereby the color code indication of said lines indicates a relative value thereof and the number of said unit members in each of said columes is a visual indication of the result of the given addition, subtraction, or multiplication problem.

8. A methematic demonstration unit as described in claim 1, wherein:
  (a) said demonstration board having a grid graph imprinted on the opposite side thereof having an equal square, secondary unit areas thereon each of said secondary unit areas equal to the said unit areas on said coordinate graph,
  (b) said grid graph including 144 of said secondary unit areas, horizontal and vertical rows designated by horizontal and vertical line indica from 1 to 12, inclusive, and consecutively numbered indicia extended along horizontal rows from 1 to 10 in the first row, 11 to 20 in the second row, to the last row having said numbered indicia from 91 to 100, and
  (c) said unit members extended horizontally within said rows on said grid graph operable to add and subtract integers and having visual indication of the result on said numbered indicia.

9. A mathematic demonstration unit as described in claim 8, wherein:
  (a) said grid graph having a base twelve indicia along the upper edge and a central base line to separate positive powers of 12 to one side thereof and negative powers of 12 to the opposite side thereof, and
  (b) said unit members positionable in vertical columes under said base twelve indicia to indicate numerical value to the base twelve whereby various base systems other than the conventional base ten can be readily understood.

10. A mathematic demonstration unit as described in claim 9, wherein:

(a) said unit members mountable on said grid graph to indicate a given fraction by the relationship of one of said unit members mounted on a lower one of said unit members to indicate a fraction, and one of said mathematical symbol elements usable in conjunction therewith to indicate the problem of addition, subtraction, or multiplication.

11. A mathematic demonstration unit as described in claim 1, wherein:

(a) said unit members having values from 1 to 12, inclusive, each varying from an adjacent one thereof by one of said volumetric units, and each of said unit members having a main body portion, an elongated groove, and a plurality of magnetic plate members securely mounted within said groove, and (b) said demonstration board constructed of a magnetically responsive material whereby said unit members are attracted to and held to said demonstration board by said magnetic plate members for easy removal and adherence to aid in the teaching and learning process.

12. A mathematic demonstration unit as described in claim 11, wherein:

(a) said unit members having equal heights and widths varying only in overall lengths whereby each of said unit members is clearly indicative of relative length equivalent to integers, and (b) said unit members mountable in an adjacent stacked relationship to form a given desired volumetric size made of a plurality of said unit bar members so as to be indicative of the Associative Law of Multiplication of Natural Numbers to show that the various volumetric sizes are actually the results of multiplication of integers.

References Cited

UNITED STATES PATENTS

| | | | |
|---|---|---|---|
| 1,955,392 | 4/1934 | Shimberg | 35—30 |
| 3,002,295 | 10/1961 | Armstrong | 35—31 |
| 3,191,318 | 6/1965 | Hoffman | 35—34 |
| 3,204,343 | 9/1965 | Pollock. | |
| 3,339,297 | 9/1967 | Stinn et al. | 35—34 X |

EUGENE R. CAPOZIO, Primary Examiner

WILLIAM H. GRIEB, Assistant Examiner